Sept. 15, 1931.                G. T. REICH                1,823,408
       APPARATUS FOR THE DEHYDRATION AND LOW TEMPERATURE
           CARBONIZATION OF WASTE SACCHARINE MATERIAL
                  Filed May 7, 1927           2 Sheets-Sheet 1

Inventor:
Gustave T. Reich
By Byrnes Townsend & Brickenstein
his Attorneys

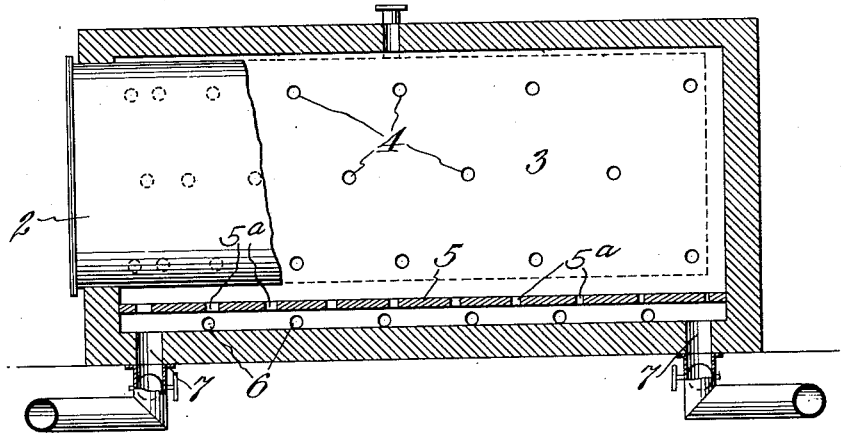
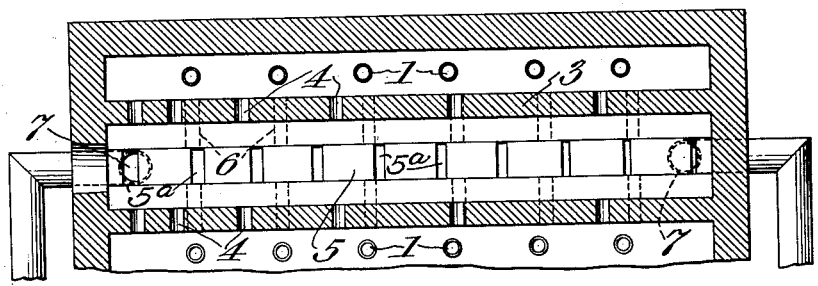

Patented Sept. 15, 1931

1,823,408

UNITED STATES PATENT OFFICE

GUSTAVE T. REICH, OF ANAHEIM, CALIFORNIA

APPARATUS FOR THE DEHYDRATION AND LOW TEMPERATURE CARBONIZATION OF WASTE SACCHARINE MATERIAL

Application filed May 7, 1927. Serial No. 189,699.

This invention relates to an apparatus adapted to a heat treatment of waste organic materials and particularly of residues from cane or beet molasses, Steffens waste water or slop from distilleries.

In my Patent 1,599,185 I have described the distillation of the fermentation residues from cane or beet molasses, Steffens waste water or slop from distilleries and the like, and pointed out what residues remain from this distillation. The patent further provides for a treatment of said residues, which results in the recovery of a valuable fertilizer. A main feature of this treatment is the retorting of said residues by which a low temperature carbonization and dehydration is effected. The apparatus for and the method of carrying out this low temperature carbonization are described and claimed in my pending application Serial No. 703,572, filed April 1, 1924, and in my Patent 1,552,732, respectively. The present application now is a further development of the two last mentioned disclosures inasmuch as the invention disclosed herein relates particularly to improvements in the construction of the retort and the manner of heating the same.

As I have discovered, it is of great advantage to heat the retort in which the waste organic materials are to be treated so as to obtain a uniform and constant temperature throughout the contents. To accomplish this I heat the retort by radiated and conducted heat in combination. Radiated heat is supplied by the brick wall forming the compartment in which the retort is heated; besides I provide for a suitable circulation of hot gases around the retort.

The position of the retort is shown generally in my copending application Serial No. 703,572; it also appears in Fig. 1 of the drawings accompanying this application. As may be seen from these drawings, the retort lies in a heating chamber. On each longitudinal side of said heating chamber is one combustion chamber separated from the former by a wall.

This wall,—as mentioned above,—radiates heat upon the retort. According to my present invention I provide port-holes in said partition wall which in combination with proper flues enable the production and control of the desired gas circulation.

The gas circulation affords the principal control of the temperature in the retort and this circulation is regulated mainly by the number, size and position of the port-holes, and in part by dampered flues, hereinafter to be described. These factors will vary, therefore, with varying size or shape of the retort and with variations in the maximum temperature desired.

The accompanying drawings show an embodiment of my invention. In the drawings the same part is always designated by the same reference character.

Fig. 3 is a longitudinal sectional elevation of one of the heating chambers showing one of the partition walls between heating and combustion chambers; and Fig. 4 is a sectional view similar to Fig. 2 but with the retort removed to disclose the flue construction underlying same.

These drawings illustrate an example of my construction. As pointed out above, the shape and size of the retort and the temperature to which it shall be heated may vary and each variation requires a more or less different construction of the furnace. To specify an example we have, therefore, to choose a definite temperature and retort.

The illustrated example shows a case in which a temperature of approximately 400° C. is desired.

Figure 1:
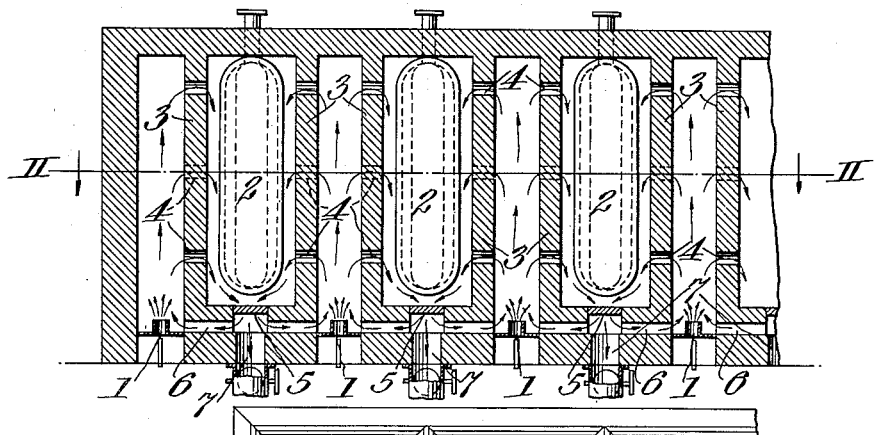
Fig. 1 is a transverse vertical sectional view taken along line 1—1 of Fig. 2, the retorts being shown in elevation.

The retort 2 used in this case may be 20 feet long, is elliptical in cross-section as shown in Fig. 1, its height being approximately 8 feet throughout its length and its width may be 18 inches on one end and continuously decreasing to approximately 12 inches on the other end. This retort lies horizontally in the heating chamber, the larger end of said retort may project beyond one end of the chamber, the smaller end of the retort preferably not quite reaching the opposite wall of the chamber. I shall call the larger end of the retort its front end and the smaller end its rear end. The corresponding ends of the heating chamber will be designated accordingly.

Figure 2:
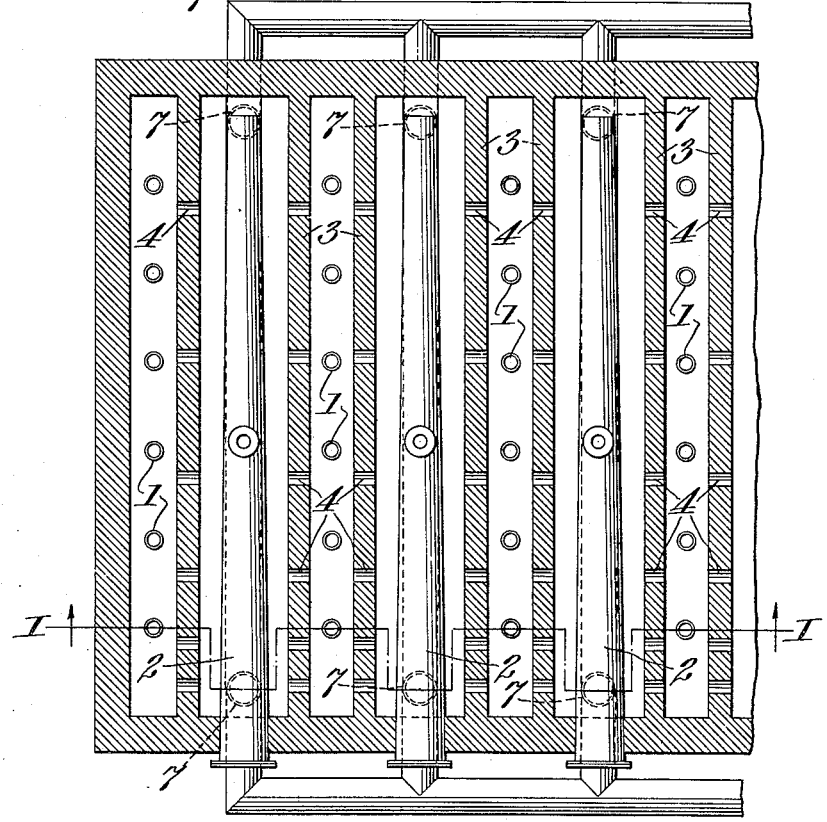
Fig. 2 is a horizontal sectional view on the line 2—2 of Fig. 1 showing three retorts assembled in the furnace, and retorts being shown in plan.

The burners 1 projecting from the floor of the heating chamber are shown in Figs. 1, 2 and 4. In this particular case I may install six burners in each combustion chamber as shown in Figs. 2 and 4. 3 designates the partition wall between heating and combustion chamber. Fig. 3 shows the particular position of port-holes 4 in this wall. Due to the forwardly flaring shape of the retort I have to provide more hot gases around the forward portion of the retort. This is accomplished by the arrangement of the port-holes. In the present example the distance between the two first port-holes of the top row and of the bottom row approximately is one foot. Approximately seven port-holes are provided for in top and bottom rows. The distance from one port-hole to the succeeding one rises approximately by one foot with each consecutive port-hole in the direction from the front to the rear end. Thus the two last port-holes in top and bottom row may be spaced six feet apart from each other. Between the top and bottom rows of port-holes I provide at least one intermediate row of port-holes each port-hole of said intermediate row lying about midway horizontally between two adjacent port-holes in one of the other rows. Consequently this middle row has approximately six port-holes in the present example.

It should be remarked at this point that the size of the port-holes, and their spacing with relation to each other and to the retort, may vary greatly. It will be obvious that, for the passage of a fixed volume of hot gases per unit of time from the combustion chamber into the heating chamber, there must be a definite relationship between the number and size of port-holes piercing the partition wall 3. With the number of port-holes determined by the spacing arrangement above described, I prefer to provide port-holes giving a total cross-sectional area of about 165–166 sq. in. per partition wall, with the size of the individual openings about as follows: Using three horizontal rows of port-holes,— each port-hole having a height of 2⅞ inches (i. e., one brick and mortar):

Number of openings in top row—7.
Width of openings:
Front—2½"—2¼"—2"—1¾"—1½"—1¼"
Back—1"
Total area of openings in row—57¾ sq. in.
Total number of openings in intermediate and bottom rows—13.
Width of openings, each 2⅞"
Total area of openings in row—107⅞ sq. in.
Hence total area of port-holes per partition wall=165⅝ sq. in.

The flue 5 is arranged below the retort. The openings 5a in the flue through which the exhaust gases are withdrawn are arranged corresponding to the port-holes, i. e., beneath the front portion of the retort and where a larger volume has to be exhausted the openings are somewhat larger than beneath the rear portions of the retort. A part of the waste gases pass through passages 6 (shown in Figs. 1 and 2) from the flue through the partition wall into the combustion chamber. The remainder passes through the outlets 7 in front and in back of the heating chamber to the stack (not shown) or utilized for preheating purposes.

An important consideration with respect to the recirculation of the hot gases from heating chamber to combustion chamber by means of the said flue is the determination of the total area of the openings 5a in the flue with relation to the total area of the port-holes piercing the partition wall; also, the determination of the relative size of said flue openings with relation to the retort, and the relation between the volumes of recirculated and of exhausted hot gases. In general, the total area of the flue openings should be at least twice the total area of the port-holes per partition wall. Thus, in the example above described, the total area of the flue openings should be about 331⅝ sq. in. Furthermore, the cross-sectional area of the individual flue openings is determined with relation to the area of the port-holes lying in about the same vertical plane, as has been indicated previously, that is, the flue openings should be spaced further apart or made of smaller cross-section in the same ratio as the port-holes are farther apart and the retort is narrower. When the outlets 7 are provided with suitable dampers it is possible to distribute the heated gases and control their direction whereby to effect an even and controlled heating of the retort.

While I have described in the foregoing and shown in the accompanying drawings an example of my invention, it is understood that I do not mean to limit the same thereby. Size and shape of the retort may be modified or the temperature may be selected higher or lower, number and size of burners increased or decreased, and the construction adapted to these modified requirements without departing from the spirit of my invention.

I claim:

1. Apparatus for the dehydration and low temperature carbonization of waste saccharine material, which comprises a heating chamber, a combustion chamber on each vertical side of said heating chamber and separated therefrom by a partition wall, means for generating hot combustion gases in said combustion chamber, a plurality of rows of port-holes in said partition wall, a substantially horizontal cylindrical retort in said heating chamber, a stack and a flue connecting the lowest portion of said heating chamber with said stack.

2. Apparatus for the dehydration and low temperature carbonization of waste saccharine material, as defined in claim 1, comprising means adapted to deliver the waste gases from the heating chamber partially to waste and partially into the combustion chamber through passages provided in the lowest part of the partition wall.

3. Apparatus for the dehydration and low temperature carbonization of waste saccharine material, which comprises a heating chamber, a combustion chamber on each vertical side of said heating chamber and separated therefrom by a partition wall, means for generating hot combustion gases in said combustion chamber, a plurality of rows of port-holes in said partition wall, a retort in said combustion chamber, said retort being of elliptical cross-section and having uniform vertical dimensions and progressively increasing horizontal dimensions from one end to the other, the port-holes in said partition wall being spaced progressively farther apart toward the end of said retort having the smaller horizontal dimensions, the port-holes in any one row thereof being positioned about midway between the port-holes of the adjacent row.

4. Apparatus for the dehydration and low temperature carbonization of waste saccharine material, which comprises a heating chamber, a combustion chamber on each vertical side of said heating chamber and separated therefrom by a partition wall, means for generating hot combustion gases in said combustion chamber, a plurality of rows of port-holes in said partition wall, a retort in said combustion chamber, said retort being of elliptical cross-section and having uniform vertical dimensions and progressively increasing horizontal dimensions from one end to the other, the port-holes in said partition wall being spaced progressively farther apart toward the end of said retort having the smaller horizontal dimensions, the port-holes in any one row being positioned about midway between the port-holes of the adjacent row, a stack, and a flue adapted to deliver the waste gases from the heating chamber partially into said stack and partially into the combustion chamber through passages provided in the lowest part of the partition wall, said flue communicating with said heating chamber through openings of progressively smaller size and greater distance from each other toward that end of said heating chamber where said port-holes are spaced farthest apart.

5. Apparatus for the dehydration and low temperature carbonization of waste saccharine material, as defined in claim 4, in which the total area of the port-holes in the partition wall is substantially one-half the total area of the openings in the flue.

6. Apparatus for the dehydration and low temperature carbonization of waste saccharine material, as defined in claim 4, in which the progressively increasing distance between port-holes in the partition wall and the progressively decreasing size of the openings in the flues, bear a direct relation to the progressively decreasing horizontal dimensions of the retort from one end thereof to the other.

7. Apparatus for the dehydration and low temperature carbonization of waste saccharine material, as defined in claim 4, in which the delivery of waste gases from the heating chamber to the stack and to the combustion chamber is controlled by a damper between the flue and the stack.

8. Apparatus for the dehydration and low temperature carbonization of waste saccharine material, as defined in claim 3, in which the port-holes of all but the top row are of uniform size and in which the port-holes in the top row are of progressively decreasing size toward that end of the heating chamber where the port-holes are spaced farthest apart.

In testimony whereof, I affix my signature.

GUSTAVE T. REICH.